US010000034B2

(12) United States Patent
Li

(10) Patent No.: US 10,000,034 B2
(45) Date of Patent: Jun. 19, 2018

(54) ENVELOPE MAKING PLATE

(71) Applicant: Parric Ningbo Stationery and Gifts Mfg. Co., Ltd., Ningbo (CN)

(72) Inventor: Fuping Li, Ningbo (CN)

(73) Assignee: Parric Ningbo Stationery and Gifts Mrg. Co., Ltd., Ningbo (CN)

( * ) Notice: Subject to any disclaimer, the term of this patent is extended or adjusted under 35 U.S.C. 154(b) by 124 days.

(21) Appl. No.: 14/900,891

(22) PCT Filed: May 21, 2014

(86) PCT No.: PCT/CN2014/078027
§ 371 (c)(1),
(2) Date: Aug. 1, 2016

(87) PCT Pub. No.: WO2015/149424
PCT Pub. Date: Oct. 8, 2015

(65) Prior Publication Data

US 2016/0332407 A1 Nov. 17, 2016

(30) Foreign Application Priority Data

Mar. 29, 2014 (CN) .......................... 2014 1 0138546

(51) Int. Cl.
*G01B 3/14* (2006.01)
*B31B 47/00* (2006.01)
(Continued)

(52) U.S. Cl.
CPC ................ *B31B 47/00* (2013.01); *B26D 3/00* (2013.01); *B31B 50/99* (2017.08); *B44B 11/04* (2013.01);
(Continued)

(58) Field of Classification Search
CPC ... B26D 3/00; B31B 2150/00; B31B 2160/10; B31B 2247/00; B31B 47/00; B31B 50/99; B31B 70/26; B44B 11/04
(Continued)

(56) References Cited

U.S. PATENT DOCUMENTS 1,810,806 A * 6/1931 Wilson ..................... B65D 3/06
33/1 F
2,920,539 A * 1/1960 Doetsch .................. B31B 70/00
493/232
(Continued)

FOREIGN PATENT DOCUMENTS

AU 2006271510 A1 1/2007
CN 202965291 U 6/2013
(Continued)

*Primary Examiner* — Yaritza Guadalupe-McCall
(74) *Attorney, Agent, or Firm* — Fish IP Law, LLP

(57) ABSTRACT

The present patent application discloses an envelope making plate. The envelope making plate includes a plate body with a marking groove, a reference edge; and a scale line or an indication line corresponding to the type of the envelope. The plate body is divided into a working area and a non-working area by the reference edge. The envelope paper abuts against or aligns with the reference edge. One side of the envelope paper is the working area, and another side is the non-working area. The marking groove is set in the working area of the plate body and intersects with the reference edge or an extension line of the reference edge. The marking groove divides the reference edge or the extension line of the reference edge into an acute angle and an obtuse angle. The scale line or the indication line corresponding to the type of the envelope is set along the reference edge and on the side where the marking groove and the reference edge form the acute angle. A second indication line is set in the non-working area of the plate body and is perpendicular to the marking groove. An exten-
(Continued)

sion line or virtual extension line of the second indication line intersects with the marking groove within the working area of the plate body. It is easy to achieve a full utilization of the plate body's area when making the envelope by making the angle between the marking groove and the indication line being as an acute angle. It saves the materials of the plate body.

9 Claims, 3 Drawing Sheets

(51) Int. Cl.

| | |
|---|---|
| ***B26D 3/00*** | (2006.01) |
| ***B44B 11/04*** | (2006.01) |
| ***B31B 50/99*** | (2017.01) |
| *B31B 160/10* | (2017.01) |
| *B31B 70/26* | (2017.01) |
| *B31B 150/00* | (2017.01) |

(52) U.S. Cl.
CPC ........... *B31B 70/26* (2017.08); *B31B 2150/00* (2017.08); *B31B 2160/10* (2017.08); *B31B 2247/00* (2013.01)

(58) Field of Classification Search
USPC ........................................................... 33/565
See application file for complete search history.

(56) References Cited

U.S. PATENT DOCUMENTS

| | | | | |
|---|---|---|---|---|
| 4,422,241 A * | 12/1983 | Meeker | G06K 5/04 | 33/563 |
| 4,742,771 A * | 5/1988 | Heilig | B07C 3/18 | 33/562 |
| 4,744,509 A * | 5/1988 | Buchler-Dopheide | B42D 15/08 | 229/68.1 |
| 5,031,332 A * | 7/1991 | Newman | B07C 3/18 | 33/562 |
| 5,518,491 A * | 5/1996 | Romer | B31B 70/00 | 229/68.1 |
| 5,626,551 A * | 5/1997 | Kearns | B42D 15/045 | 206/232 |
| 5,685,816 A * | 11/1997 | Romer | B31B 19/00 | 493/231 |
| 6,635,003 B2 * | 10/2003 | Marchant | B43M 3/045 | 33/562 |
| 2003/0070313 A1 * | 4/2003 | Romer | B42D 15/08 | 33/566 |
| 2007/0033821 A1 * | 2/2007 | Robertson | B43L 13/028 | 33/562 |
| 2008/0301964 A1 * | 12/2008 | Jordan | B31B 70/00 | 33/562 |
| 2016/0332407 A1 * | 11/2016 | Li | B31B 47/00 | |

FOREIGN PATENT DOCUMENTS

| | | |
|---|---|---|
| CN | 202968289 U | 6/2013 |
| CN | 203357960 U | 12/2013 |
| TW | M440876 U | 11/2012 |

* cited by examiner

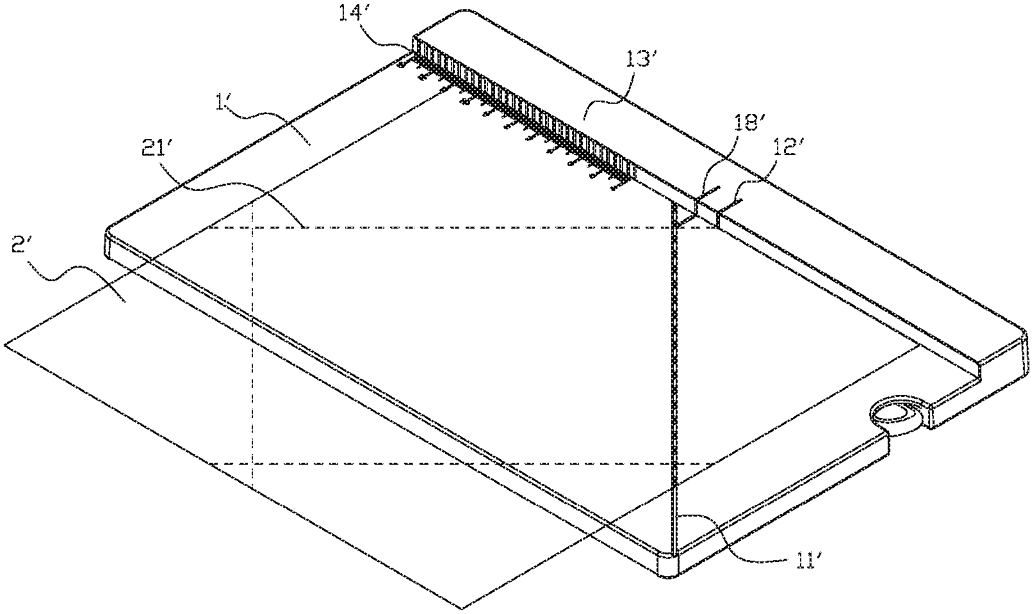
FIGURE 1 -- PRIOR ART --
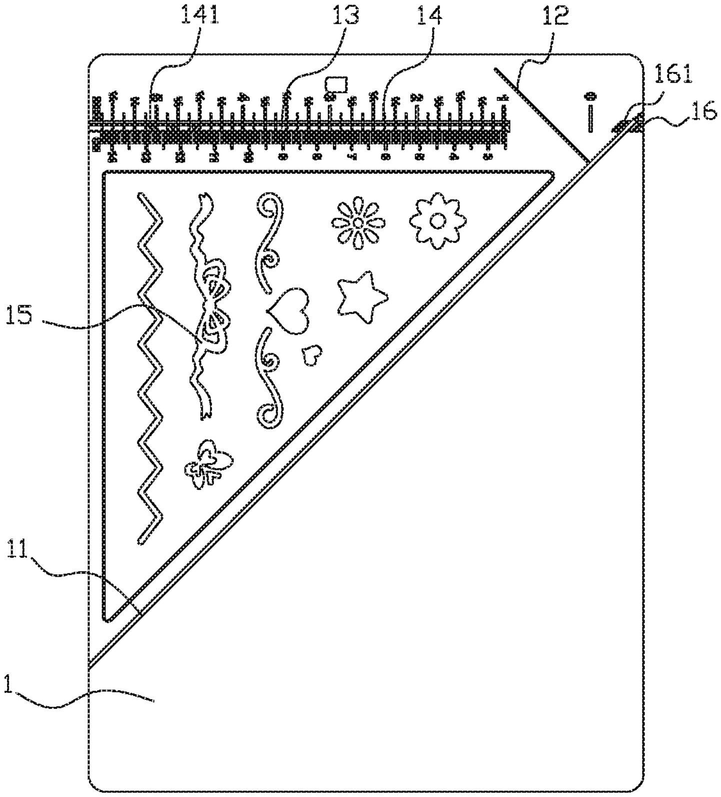
FIGURE 2

ENVELOPE MAKING PLATE

TECHNICAL FIELD

The present patent application relates to a paper products making tool, and particularly relates to an envelope making plate.

BACKGROUND

Referring to FIG. 1, an existing envelope making plate includes a plate body 1' with a marking groove 11', a reference edge 13' abutting against or aligning to an envelope paper 2', a scale line 14' or an indication line which is direct to the type of the envelope. A utility knife is used to mark a folding line 21' on the envelope paper 2' along the marking groove 11'. The envelope is folded by means of the folding line 21'. The zero point 18' on the scale line is the projection point of the intersection of the adjacent folding lines which is vertically projected to the reference edge. When making an envelope, the envelope paper 2' abuts against or aligns to the reference edge 13' and then aligns to the scale line or the indication line according to the size of the envelope. A first folding line 21' is marked under the constraint of the marking groove 11'. Then the envelope paper is rotated 90 degrees and aligns to the reference edge 13' again. The first folding line is aligned to the second indication line 12' and a second folding line is marked. The above operation is repeated until all the folding lines are marked.

The disadvantage of the existing envelope making plate is that, the angle between the marking groove 11' and the scale line 14' is set as an obtuse angle of 135 degrees, which makes the breadth of the plate body larger and the flat space of the plate body can't be fully utilized. Meanwhile, because the plate body is larger, the rigidity and intensity of the plate body are insufficient. A reinforcing rib is added on the back of the plate body to make sure the front of the plate body can work normally, thus the use of the space on the back of plate body has to be abandoned.

SUMMARY

In order to solve the problems of the existing technology mentioned above, the angle between the marking groove and the indication line is set as an acute angle, which achieves a full utilization of the front and the back of plate body when making the envelope.

To achieve the purpose of the patent application mentioned above, the present patent application provides an envelope making plate. The envelope making plate includes a plate body with a marking groove, a reference edge, and a scale line or an indication line corresponding to the type of the envelop. The plate body is divided into working area and non-working area by the reference edge. The envelope paper abuts against or aligns with the reference edge. One side of the envelope paper is the working area, and the other side is the non-working area. The marking groove is set in the working area of the plate body and intersects with the reference edge or the extension line of the reference edge. The reference edge or the extension line of the reference edge is divided into acute angle area and obtuse angle area. The scale line or the indication line corresponding to the type of the envelop is set along the reference edge and on the side of the acute angle between the marking groove and the reference edge. A second indication line is set in the non-working area of the plate body and is perpendicular to the marking groove. The extension line or virtual extension line of the second indication line intersects with the marking groove within the working area of the plate body. When making an envelope, the envelope paper abuts against or aligns to the reference edge and then aligns to the scale line or the indication line according to the size of the envelope. It forms a total constraint to the envelope paper. The zero point on the scale line or the indication line of the envelope is the projection point of the intersection of the second indication line and the marking groove which is vertically projected to the reference edge. A first folding line is marked via the marking groove. Then the envelope paper is rotated 90 degrees. It make the adjacent edge of the envelope abut against or align to the reference edge again. The first folding line aligns to the second indication line and a second folding line is marked via the marking groove. The first folding line, the second folding line and the edge of the envelope paper form a triangular envelope folding area. The above operation can be repeated until all the folding lines are marked.

In one embodiment, the surface of the second indication line is parallel to the working area of the plate body. It is convenient for the folding line of the envelope paper to align to the second indication line. Moreover, it is difficult to generate a visual illusion during aligning operation. A second protruded reference edge is set on the other side of the second indication line. The second protruded reference edge is the extension section of the reference edge and aligns to the reference edge. It makes the location of the envelope paper more reliable.

In one embodiment, the acute angle between the marking groove and the reference edge is about 45 degrees and extends to the non-working area of the plate body. The extension section of the marking groove forms a guiding groove. The guiding groove passes through the second reference edge and divides the second reference edge into two segments. The second reference edge facing to the guiding groove forms an upward open guiding surface. It is convenient for the utility knife which generates folding line of the envelope paper to enter into the guiding groove and mark a folding line from the extreme edge of the envelope paper. The requirement for the initial point of the utility knife is reduced and the operation is more easily.

In one embodiment, the reference edge protrudes out of the surface of the plate body. The plate body doesn't interfere in the second indication line. The aligning operation between the folding line of the envelope paper and the second indication line won't be affected when the envelope paper abuts against the reference edge.

In one embodiment, the surface of the plate body is also provided with some recessed or protruded patterns to stamp recessed or protruded decorative patterns on the surface of the envelope paper.

In one embodiment, the back of the plate body is provided with a card maker matching with the envelope. The card maker includes a card marking groove and a card making reference edge setting on the back of the plate body. The card marking groove includes a plurality of card marking grooves according to the type of the card. The card marking grooves are parallel to each other and form working area of card making. There are two card making reference edges and protrude out of the working area of card making. The card making reference edges are set outside of the working area of card making and respectively is parallel to and perpendicular to the card marking groove. The card making reference edge parallel to the card marking groove is the first card making reference edge, the card making reference edge perpendicular to the card marking groove is the second card making reference edge.

In one embodiment, the card marking groove is also provided with an extended card guiding groove. The card guiding groove passes through the second card making reference edge and divides the second card reference edge into a plurality of independent segments. The second card reference edge facing to the guiding groove forms an upward open guiding surface. It is convenient for the utility knife to enter into the guiding groove along the guiding surface and mark a folding line from the extreme edge of the envelope paper when making a card.

In one embodiment, the external side of the first card making reference edge is also provided with a first card making scale line along the card marking groove and a second card making scale line along the external side of the second card making reference edge. A card making auxiliary scale line is set outside of the working area of card making and respectively is parallel to the first card making reference edge and the second card making reference edge.

In one embodiment, the working area of card making keeps abreast of the non-working area of card making of the outside of the first card making reference edge and the second card making reference edge. The card making auxiliary scale line is parallel to the second card making reference edge and is set in the non-working area of card making. The surface of the non-working area of card making keeps abreast of or is slightly under the bottom of the card marking groove, make the utility knife can separate from the card marking groove easily at the end of the card marking groove. Only the first card making reference edge and the second card making reference edge are set on and protrude out of the back of the plate body. The rest of the back of the plate body keep a flush surface except the area of the non-working area where the second scale line is. It makes the plate body have a smooth surface and a light structure. It is comfortable to hold.

Compared to the prior art, the present patent application has below advantages:

1. The angle between the marking groove and the scale line is set as an acute angle of 45 degrees and it is convenient to achieve a full utilization of the area of plate body when making the envelope and save the materials of the plate body. The back of plate body is utilized more fully and the function of the present invention is increased.
2. A second reference edge is set on the surface of the envelope making plate body. A guiding groove extending from the marking groove passes through the second reference edge and make the surface of second reference edge facing to the guiding groove can be set as an upward open guiding surface. It is convenient for the utility knife to enter into the guiding groove and mark a folding line from the extreme edge of the envelope paper.
3. The second indication line is set to align to the working area of the plate body. It is convenient for the folding line of the envelope paper to align to the second indication line. Moreover, it is not easy to generate a visual illusion during aligning operation.
4. A card maker matching with the envelope is set on the back of the plate body. It is beneficial to both making all kinds of cards matching with the envelope quickly and making the best use of the back of the plate body, which saves the total cost.
5. The second reference edge of the card maker is divided by the card marking groove which makes the surface of the second card reference edge facing to the guiding groove can be set as an upward open guiding surface. It is convenient for the utility knife to enter into the guiding groove and mark a folding line from the extreme edge of the envelope paper when making a card.
6. The surface of the non-card making area where the card making auxiliary scale line keeps abreast of or below the bottom of the card marking groove. The card making auxiliary scale line is parallel to the second card making reference edge. It make the utility knife can separate from the card marking groove easily at the end of the card marking groove. It is convenient for the utility knife to operate.

BRIEF DESCRIPTION OF THE DRAWINGS

FIG. 1 is a perspective view of a conventional envelope making plate.

FIG. 2 is a top view of the envelope making plate according to one embodiment of the present patent application.

In Figures: 1—plate body, 11—marking groove, 111—guiding groove, 12—second indication line, 121—extension line of the second indication line, 13—reference edge, 14—scale line, 141—indication line, 15—pattern, 16—second reference edge, 161—guiding surface, 18—zero point, 2—envelope paper, 21—folding line, 22—envelope folding area, 31—card marking groove, 311—card guiding groove, 32—first card making reference edge, 33—second card making reference edge, 34—first card making scale line, 35—second card making scale line, 36—card making auxiliary scale line, 37—non-working area of card making, 4—utility knife.

DETAILED DESCRIPTION

The present patent application will be further described with reference to the drawings. The following embodiments are used to illustrate the present patent application rather than limit the present patent application.

Figure 3:
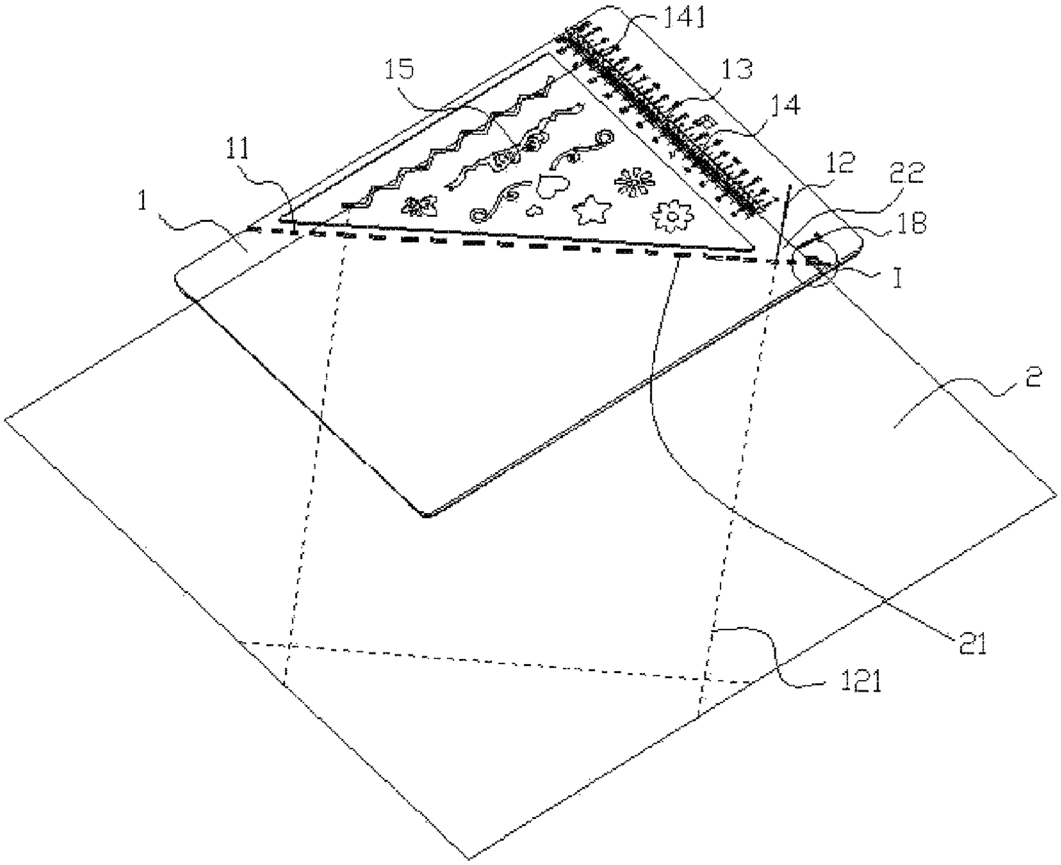
FIG. 3 is a perspective view of the envelope making plate according to one embodiment of the present patent application with a processed envelope paper.

Referring to FIG. 2 and FIG. 3, an envelope making plate of the present patent application includes a plate body 1 with a marking groove 11, a reference edge 13, a scale line 14 or an indication line 141 corresponding to the type of the envelope. The plate body 1 is divided into a working area and a non-working area by the reference edge 13. The envelope paper 2 abuts against or aligns with the reference edge 13. One side of the envelope paper is the working area, and the other side is the non-working area. The marking groove 11 is set in the working area of the plate body and intersects with the reference edge 13 or the extension line of the reference edge. The marking groove 11 divides the reference edge 13 or the extension line of the reference edge into an acute angle of about 45 degrees and an obtuse angle of about 135 degrees. The scale line 14 or the indication line

141 corresponding to the type of the envelope is set along the reference edge 13 and on the side where the marking groove 11 and the reference edge 13 form the acute angle of 45 degrees. A second indication line 12 is set in the non-working area of the plate body and is perpendicular to the marking groove 11. The extension line 121 (or the virtual extension line) of the second indication line intersects with the marking groove 11 within the working area of the plate body. When making an envelope, the envelope paper 2 abuts against or aligns to the reference edge 13 and then aligns to the scale line 14 or the indication line 141 according to the size of the envelope. This forms a completely constraint to the envelope paper. The zero point 18 on the scale line 14 or the indication line 141 of the envelope module is the projection point of the intersection of the second indication line 12 and the marking groove 11 which is projected to the reference edge or the extension line of the reference edge. A first folding line is marked via the marking groove. Then, the envelope paper 2 is rotated 90 degrees which make an adjacent edge of the envelope abut against or align to the reference edge 13 again. The first folding line 21 aligns to the second indication line 12. A second folding line is marked via the marking groove. The first folding line, the second folding line and the edge of the envelope paper form a triangular envelope folding area 22. The above operation can be repeated until all the folding lines are marked.

Figure 4:
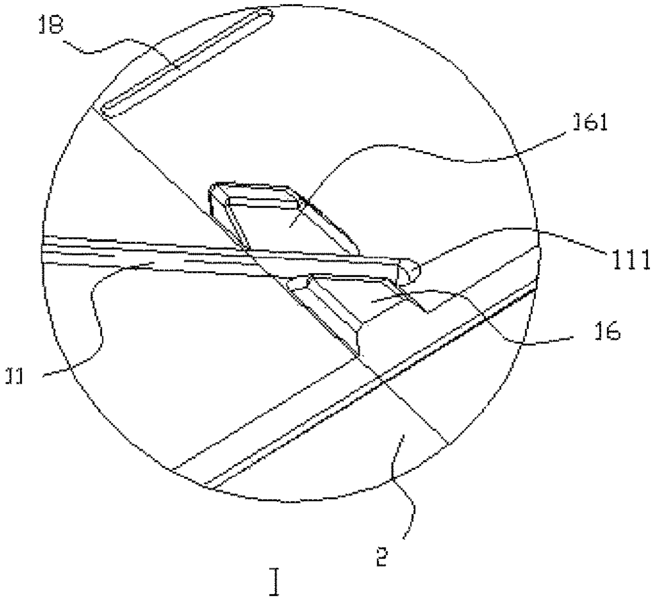
FIG. 4 is an enlarged view of part I in FIG. 3.

Referring to FIGS. 2, 3 and 4, the surface of the second indication line 12 is parallel to the working area of the plate body 1. It is convenient for the folding line 21 of the envelope paper to align to the second indication line 12. Moreover, it is not easy to generate a visual illusion during aligning operation. A second protruded reference edge 16 is set on one side of the second indication line 12. The second protruded reference edge 16 aligns to the reference edge 13 and make the location of the envelope paper more reliable.

Referring to FIG. 3, the reference edge 13 protrudes out of the surface of the plate body 1, and the reference edge 13 doesn't intervene with the second indication line 12, so that the aligning operation between the folding line 21 of the envelope paper and the second indication line 12 won't be affected when the envelope paper 2 abuts against the reference edge 13.

Referring to FIGS. 2, 3 and 4, the marking groove 11 extends to the non-working area of the plate body. The extension section of the marking groove 11 forms a guiding groove 111. The guiding groove 111 passes through the second reference edge 16 and divides the second reference edge 16 into two segments. The second reference edge 16 facing to the guiding groove forms an upward open guiding surface 161. It is convenient for the utility knife which produces folding line of the envelope paper to enter into the guiding groove 111 and mark a folding line from the extreme edge of the envelope paper. The requirement of the utility knife for the initial point is reduced and the operation is more easily.

Referring to FIGS. 2 and 3, the surface of the plate body 1 is also provided with a plurality of recessed or protruded patterns 15. Different patterns are chosen based on the requirement of the envelope. The patterns 15 are set in the triangular area surrounding by the marking groove 11 and the reference edge 13. It is convenient to position by taking advantage of the scale line 14 along the reference edge. The patterns 15 can also be set in the area surrounding by the marking groove 11 and the edge of the plate body. Sometimes an additional scale line needs to be set in this area. Recessed or protruded decorative patterns can be stamped on the surface of the envelope paper 2 by the patterns 15.

Figure 5:
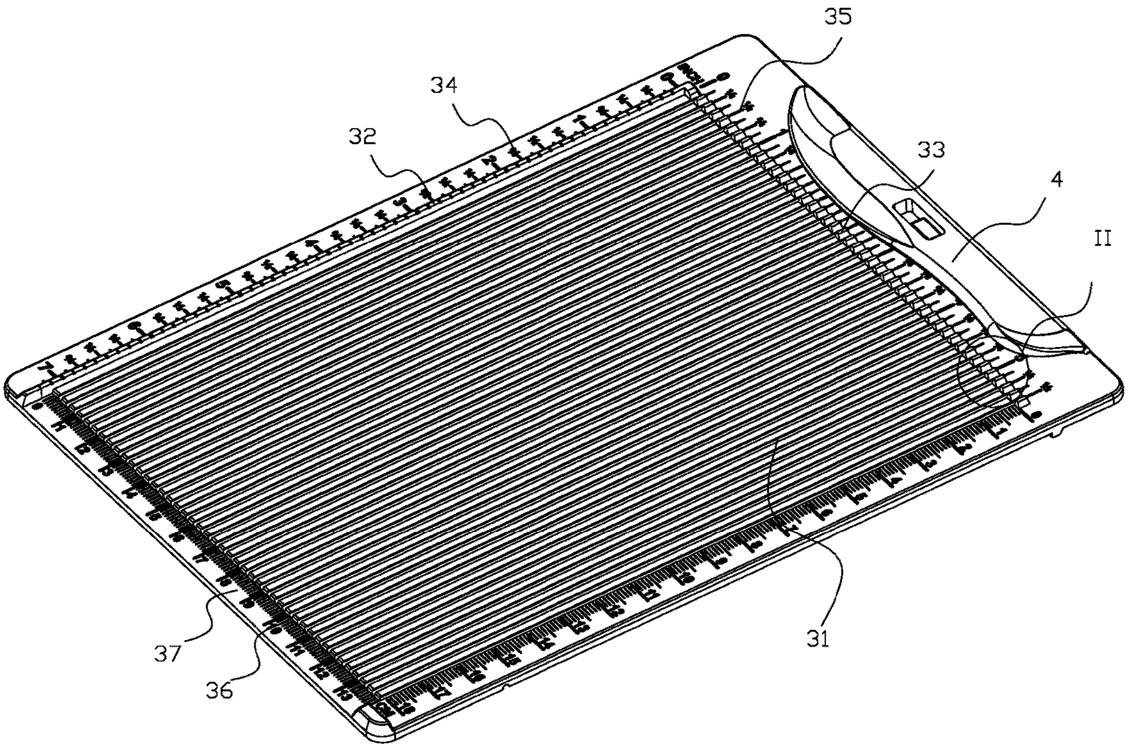
FIG. 5 is a perspective view of the card maker setting on the back of the plate body of the envelope making plate according to one embodiment of the present patent application.

Referring to FIG. 5, a card maker matching with the envelope is set on the back of the plate body 1. The card maker includes a plurality of card marking groove 31 and a card making reference edge setting on the back of the plate body. Each of the plurality of the card marking grooves is parallel to each other and forms a working area for card making. There are two card making reference edges 32, 33, which protrude out of the working area of card making. The card making reference edges are set outside of the working area of card making. A first card making reference edge 32 is parallel to the card marking groove. A first card making scale line 34 is set along the external side of the first card making reference edge 32. A second card making reference edge 33 is perpendicular to the card marking groove. A second card making scale line 35 is set along the external side of the second card making reference edge 33. The utility knife 4 can be put in the area where the second card making scale line 35 is and can be used at any time. A card making auxiliary scale line 36 is set outside of the working area of card making. The card making auxiliary scale line 36 is parallel to the first card making reference edge 32 and the second card making reference edge 33. It is convenient for the aligning operation when making a card.

Figure 6:
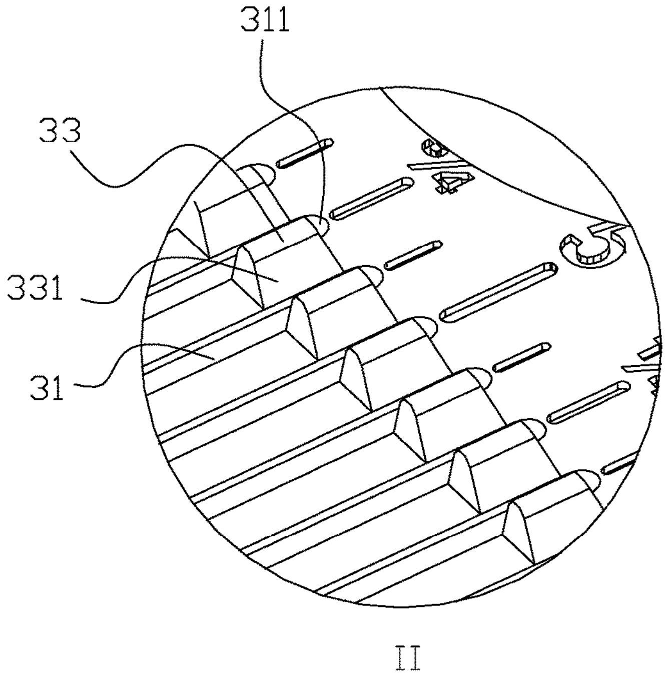
FIG. 6 is an enlarged view of part II in FIG. 5.

Referring to FIG. 6, the card marking groove 31 is also provided with an extended card guiding groove 311. The card guiding groove 311 passes through the second card making reference edge 33 and divides the second card making reference edge 33 into a plurality of independent segments. The surface of the second card reference edge facing to the guiding groove forms an upward open guiding surface 331. It is convenient for the utility knife to enter into the guiding groove and mark a folding line from the extreme edge of the envelope paper when making a card.

Referring to FIG. 5, the working area of card making keeps abreast of the non-working area of card making. The non-working area of card making is at an external side of the first card making reference edge 32 and the second card making reference edge 33. The card making auxiliary scale line 36 is parallel to the second card making reference edge 33 and is set in the non-working area of card making 37. The surface of the non-working area of card making 37 keeps abreast of or is slightly under the bottom of the card marking groove. This can make the utility knife separate from the card marking groove easily at the end of the card marking groove. Only the first card making reference edge and the second card making reference edge are protruded out of the back of the plate body. The rest of the back of the plate body keep a flush surface except the area of the non-working area where the second scale line is. It makes the plate body have a smooth surface and a light structure. It is comfortable to hold.

The angle between the marking groove and the scale line is set as an acute angle of 45 degrees and it is convenient to achieve a full utilization of the area of plate body when making the envelope. The materials of the plate body are saved. The back of plate body can be utilized more fully. A second reference edge is set on the surface of the envelope making plate body. A guiding groove extending from the marking groove passes through the second reference edge and make the surface of second reference edge facing to the guiding groove can be set as an upward open guiding surface. It is convenient for the utility knife to enter into the guiding groove and mark a folding line from the extreme edge of the envelope paper. The second indication line is set to align to the working area of the plate body. It is convenient for the folding line of the envelope paper to align to the second indication line. Moreover, it is not easy to generate a visual illusion during aligning operation. A card maker matching with the envelope is set on the back of the plate body. It is beneficial to both making all kinds of cards matching with the envelope quickly and making the best use of the back of the plate body, which saves the total cost. The second reference edge of the card maker is divided by the card marking groove which makes the surface of the second card reference edge facing to the guiding groove can be set as an upward open guiding surface. It is convenient for the utility knife to enter into the guiding groove and mark a folding line from the extreme edge of the envelope paper when making a card. The surface of the non-card making area where the card making auxiliary scale line keeps abreast of or below the bottom of the card marking groove. The card making auxiliary scale line is parallel to the second card making reference edge. It make the utility knife can separate from the card marking groove easily at the end of the card marking groove. It is convenient for the utility knife to operate.

Above is only embodiments of the present patent application, it should be noted that for the person skilled in the art can make some modifications without departing from the spirit and scope of the patent application.

What is claimed is:

1. An envelope making plate, comprising:

a plate body with a marking groove, a reference edge; and a scale line or an indication line corresponding to a type of the envelope, wherein the plate body is divided into a working area and a non-working area by the reference edge, the envelope paper abuts against or aligns with the reference edge; one side of the envelope paper is the working area, another side is the non-working area;

the marking groove is set in the working area of the plate body and intersects with the reference edge or an extension line of the reference edge; the marking groove divides the reference edge or the extension line of the reference edge into an acute angle and an obtuse angle;

the scale line or the indication line corresponding to the type of the envelope is set along the reference edge and on the side where the marking groove and the reference edge form the acute angle;

a second indication line is set in the non-working area of the plate body and is perpendicular to the marking groove; an extension line or virtual extension line of the second indication line intersects with the marking groove within the working area of the plate body.

2. The envelope making plate in claim 1, wherein the surface of the second indication line is parallel to the working area of the plate body; a second protruded reference edge is set on one side of the second indication line, the second protruded reference edge is an extension section of the reference edge.

3. The envelope making plate in claim 2, wherein the angle between the marking groove and the reference edge is 45 degrees, the marking groove extends to the non-working area of the plate body and forms a guiding groove, the guiding groove passes through the second reference edge and divides the second reference edge into two segments, the second reference edge facing to the guiding groove forms an upward open guiding surface.

4. The envelope making plate in claim 3, wherein the reference edge protrudes out of the surface of the plate body, and the plate body doesn't interfere with the second indication line.

5. The envelope making plate in claim 1, wherein the surface of the plate body is also provided with a plurality of recessed or protruded patterns for stamping recessed or protruded decorative patterns on a surface of the envelope paper.

6. The envelope making plate in claim 1, wherein the back of the plate body is also provided with a card maker matching with the envelope, the card maker comprises a card marking groove and a card making reference edge setting on the back of the plate body; the card marking groove consists of a plurality of card marking grooves, each of the plurality of the card marking grooves is parallel to each other and forms a working area for card making; a first card making reference edge and a second card making reference edge are set outside of a working area of card making groove, the first card making reference edge is parallel to the card marking groove; the second card making reference edge is perpendicular to the card marking groove.

7. The envelope making plate in claim 6, wherein the card marking groove is also provided with an extended card guiding groove, the card guiding groove passes through the second card making reference edge and divides the second card making reference edge into a plurality of independent segments; the second card making reference edge facing to the guiding groove forms an upward open guiding surface.

8. The envelope making plate in claim 6, wherein a first card making scale line is set along the card marking groove and at an external side of the first card making reference edge; a second card making scale line is set along the external side of the second card making reference edge; a card making auxiliary scale line is set outside of the working area for card making; and the card making auxiliary scale line is parallel to the first card making reference edge and the second card making reference edge.

9. The envelope making plate in claim 8, wherein the working area of card making keeps abreast of a non-working area of card making which is at an external side of the first card making reference edge and the second card making reference edge; the surface of the non-working area of card making where the card making auxiliary scale line parallel to the second card making reference edge keeps abreast of or under a bottom of the card marking groove.

* * * * *